(12) United States Patent
Sim

(10) Patent No.: US 8,411,896 B2
(45) Date of Patent: Apr. 2, 2013

(54) GAUGE READING DEVICE AND SYSTEM

(75) Inventor: Harry Sim, San Jose, CA (US)

(73) Assignee: Cypress Envirosystems, Inc., San Jose, CA (US)

( * ) Notice: Subject to any disclaimer, the term of this patent is extended or adjusted under 35 U.S.C. 154(b) by 1379 days.

(21) Appl. No.: 11/644,332

(22) Filed: Dec. 21, 2006

(65) Prior Publication Data

US 2008/0148877 A1    Jun. 26, 2008

(51) Int. Cl.
*G06K 9/00* (2006.01)
(52) U.S. Cl. ........................................ 382/100
(58) Field of Classification Search .......... 382/124–127, 382/141–152
See application file for complete search history.

(56) References Cited

U.S. PATENT DOCUMENTS

| | | | |
|---|---|---|---|
| 4,175,860 A * | 11/1979 | Bacus | 356/39 |
| 4,309,385 A * | 1/1982 | Harada et al. | 422/83 |
| 4,310,133 A | 1/1982 | Wetterhorn et al. | |
| 4,410,155 A | 10/1983 | Wetterhorn et al. | |
| 4,680,704 A | 7/1987 | Konicek et al. | |
| 4,685,074 A * | 8/1987 | May et al. | 382/144 |
| 4,948,074 A | 8/1990 | Bramhall, Jr. | |
| 5,013,154 A * | 5/1991 | Kominsky | 356/615 |
| 5,359,677 A | 10/1994 | Katsurada et al. | |
| 5,442,737 A * | 8/1995 | Smith | 345/639 |
| 5,542,280 A | 8/1996 | Markow et al. | |
| 5,559,894 A * | 9/1996 | Lubliner et al. | 382/100 |
| 5,672,823 A | 9/1997 | Lachmann et al. | |
| 5,673,331 A * | 9/1997 | Lewis et al. | 382/100 |
| 5,861,910 A * | 1/1999 | McGarry et al. | 348/87 |
| 5,870,140 A | 2/1999 | Gillberry | |
| 6,049,620 A * | 4/2000 | Dickinson et al. | 382/124 |
| 6,053,043 A | 4/2000 | Dannenberg et al. | |
| 6,085,597 A | 7/2000 | Miller et al. | |
| 6,244,107 B1 | 6/2001 | Nelson et al. | |
| 6,282,969 B1 | 9/2001 | Daniel | |
| 6,314,197 B1 | 11/2001 | Jain et al. | |
| 6,326,896 B1 | 12/2001 | Mcdermott et al. | |
| 6,529,622 B1 * | 3/2003 | Pourjavid | 382/149 |
| 6,845,177 B2 * | 1/2005 | Chiu | 382/199 |
| 6,853,309 B1 | 2/2005 | Schroeter | |

(Continued)

FOREIGN PATENT DOCUMENTS

JP    2079699 A    3/1990
JP    6281504 A    10/1994

(Continued)

OTHER PUBLICATIONS

U.S. Appl. No. 12/241,171, Sim et al.

(Continued)

*Primary Examiner* — Alex Liew
(74) *Attorney, Agent, or Firm* — Manuel de la Cerra

(57) ABSTRACT

A gauge monitoring system can include a parameter store that stores parameter data in digital form for at least one gauge. The parameter data can correspond to different gauge readings. An image processing circuit can be coupled to receive image data from an image sensor physically attached to at least one gauge. The image processing circuit can analyze the image data to generate image data points corresponding to the gauge image and generates a gauge reading from the image data points and the parameter data. A transmitting circuit transmit the gauge reading to a location remote from the gauge. A control circuit that activates the image processing circuit and couples the gauge reading to the transmitting circuit.

41 Claims, 13 Drawing Sheets

U.S. PATENT DOCUMENTS

| | | | |
|---|---|---|---|
| 6,891,838 B1 | 5/2005 | Petite et al. | |
| 6,938,859 B2 | 9/2005 | Beausoleil | |
| 7,064,678 B2 | 6/2006 | Kim et al. | |
| 7,151,246 B2 | 12/2006 | Fein et al. | |
| 7,305,664 B2 | 12/2007 | Yamagata | |
| 7,450,765 B2 | 11/2008 | Wenzel | |
| 7,502,493 B2 | 3/2009 | Ishida | |
| 8,009,020 B2 | 8/2011 | Riedel et al. | |
| 2001/0002850 A1 | 6/2001 | Slatter | |
| 2001/0055425 A1 | 12/2001 | Chiu | |
| 2002/0097904 A1 | 7/2002 | White | |
| 2003/0016860 A1 | 1/2003 | Sugawara | |
| 2003/0030855 A1 | 2/2003 | Honda | |
| 2003/0197882 A1 | 10/2003 | Tsukuba et al. | |
| 2004/0022435 A1 | 2/2004 | Ishida | |
| 2004/0045380 A1 | 3/2004 | Nelson et al. | |
| 2004/0101191 A1 | 5/2004 | Seul et al. | |
| 2004/0150861 A1 | 8/2004 | Van Der | |
| 2005/0105805 A1 | 5/2005 | Nicponski | |
| 2005/0165279 A1 | 7/2005 | Adler et al. | |
| 2005/0280709 A1* | 12/2005 | Katayama | 348/187 |
| 2006/0178193 A1 | 8/2006 | Hunter | |
| 2006/0212407 A1 | 9/2006 | Lyon | |
| 2006/0238846 A1 | 10/2006 | Alexander et al. | |
| 2007/0005202 A1 | 1/2007 | Breed | |
| 2009/0073307 A1 | 3/2009 | Kramer et al. | |
| 2009/0190795 A1 | 7/2009 | Derkalousdian et al. | |

FOREIGN PATENT DOCUMENTS

| | | |
|---|---|---|
| JP | 10332420 A | 12/1998 |
| JP | 2004045231 A | 2/2004 |
| JP | 2005032028 A | 2/2005 |

OTHER PUBLICATIONS

PCT International Search Report for International Application No. PCT/US07/26186, dated Jun. 2, 2008.

PCT Written Opinion of the International Searching Authority for for International Application No. PCT/US07/26186, dated Jun. 2, 2008.

"Item Details: Grainger 1X815 Pressure Transmitter", Internet at http://www.grainger.com/Grainger/wwg/itemDetailsRender.shtml?ItemID=1611625135.

"A-D converter the hard (but cheap!) way", Internet at http://www.eissq.com/DialADC.html#Matlabcode.

SIPO Office Action Aug. 17, 2011; 8 pages.

SIPO Office Action May 19, 2011; 5 pages.

SIPO Office Action Jan. 12, 2011; 17 pages.

International Search Report for International Application No. PCT/US09/00643, mailed on Mar. 17, 2009; 2 pages.

International Written Opinion for International Application No. PCT/US09/00643, mailed on Mar. 17, 2009; 5 pages.

U.S. Appl. No. 61/024,800, "Line Angle Detection in Digital Image Captures," Moses Derkalousdian et al., filed Jan. 30, 2008; 8 pages.

USPTO Final Rejection for U.S. Appl. No. 12/322,200 dated Aug. 14, 2012; 13 pages.

USPTO Non-Final Rejection for U.S. Appl. No. 12/283,701 dated Sep. 13, 2012; 14 pages.

USPTO Non-Final Rejection for U.S. Appl. No. 12/322,200 dated May 10, 2012; 14 pages.

U.S. Appl. No. 61/024,932, "Wireless Gauge Reader Distributed Monitoring System," Harry Sim et al., filed Jan. 31, 2008; 6 pages.

International Search Report for International Application No. PCT/US07/26186, dated Jun. 2, 2008; 4 pages.

JPPO 3 Month Office Action Receive for Application No. 2009-542939, dated Jun. 12, 2012; 2 pages.

Kenn Sebesta, "A-D Converter the Hard (But Cheap!) Way," Internet at <http://www.eissq.conn/DialADC.html#Matlabcode>, 2008; 11 pages.

SIPO 2 Month Office Action Receive for Application No. 200780045651.0, dated Jan. 31, 2012; 17 pages.

SIPO 2 Month Office Action Receive for Application No. 200780045651.0, dated Apr. 27, 2012; 18 pages.

SIPO 3 Month Office Action Receive for Application No. 200780045651.0, dated Jul. 25, 2012; 15 pages.

SIPO Office Action Receive for Application No. 200780045651.0, dated Dec. 20, 2010; 17 pages.

USPTO Advisory Action for U.S. Appl. No. 12/322,200, dated Nov. 5, 2012; 3 pages.

Written Opinion of the International Searching Authority for International Application No. PCT/US07/26186, mailed Jun. 2, 2008; 7 pages.

* cited by examiner

FIG. 16
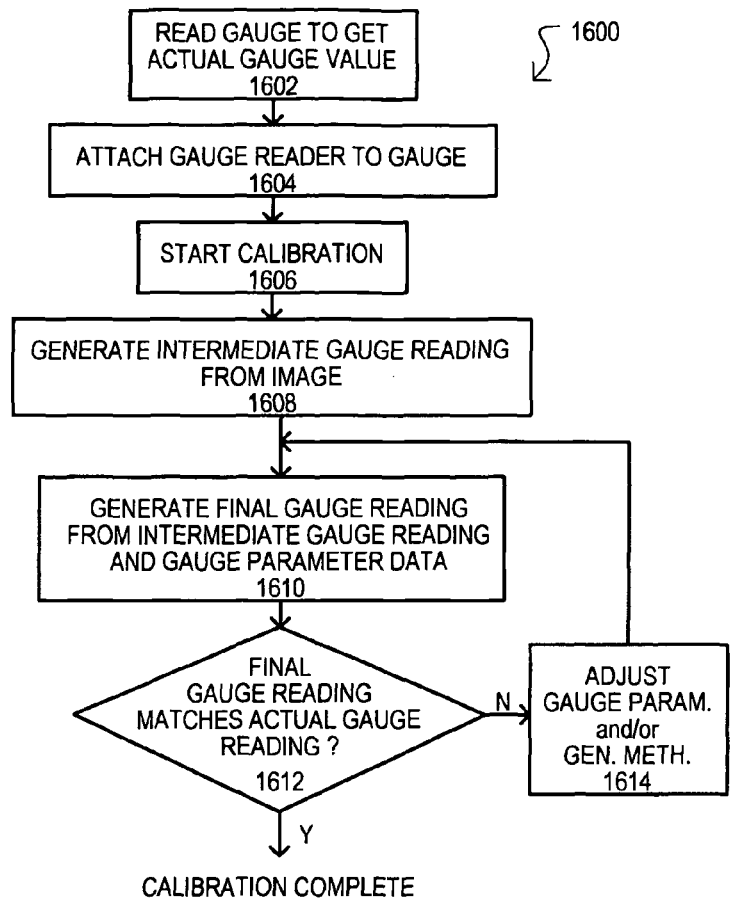
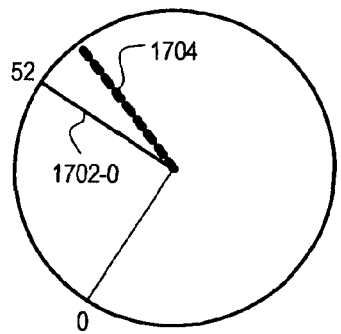
FIG. 17A
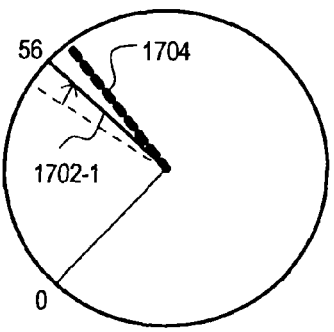
FIG. 17B
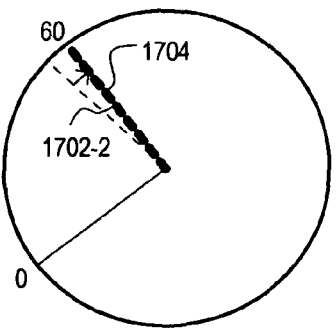
FIG. 17C

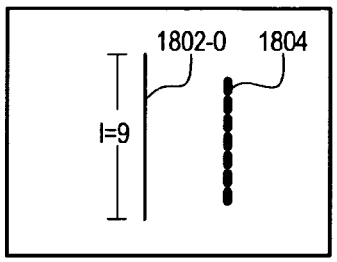
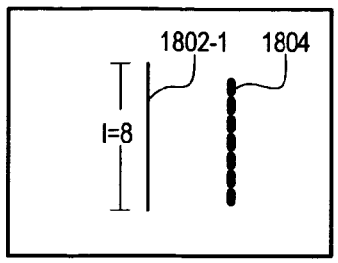
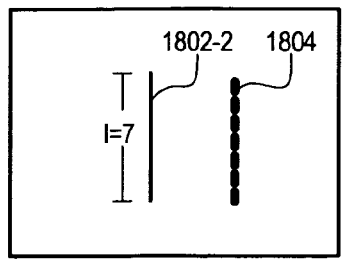
FIG. 18A　　　　　FIG. 18B　　　　　FIG. 18C
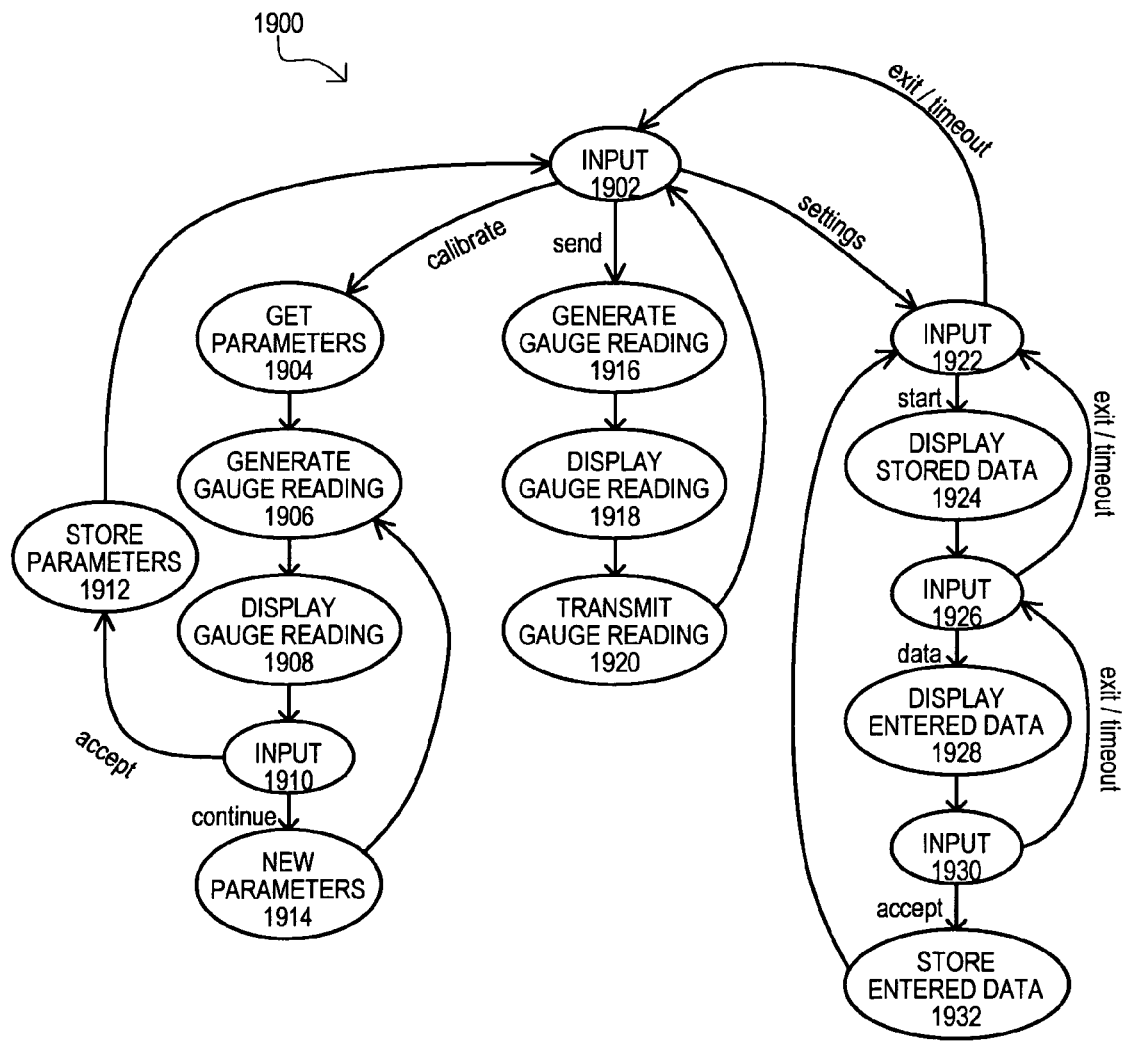
FIG. 19

GAUGE READING DEVICE AND SYSTEM

TECHNICAL FIELD

The present invention relates generally to gauge monitoring, and more particularly to a gauge reading system that converts a gauge image into a transmittable signal.

BACKGROUND OF THE INVENTION

Gauges enjoy wide use in a variety of industries and applications. A gauge can typically include a measurement section and a display section. A measurement section can measure some condition (e.g., pressure, temperature, rate, position, time, concentration, density, force, intensity, physical dimension, velocity, acceleration, or other quantities, to name but a few). A display section can display the measured value.

Many gauges, typically analog gauges, include a display intended for human eyes. As but a few examples, a gauge can represent a measurement value with a deflected needle (or arrow), a variable bar size, or other geometric shape that varies according to a measured value.

Modern monitor and control systems are typically designed with a centralized monitoring system. However, because some gauges are designed for visual examination, they typically do not output an electrical signal and thus cannot be easily integrated with a central control system.

A first conventional approach to integrating a gauge into a system can involve the entire replacement of a gauge with a transmitting unit. An example of such a device can be found on the Internet at http://www.grainger.com/Grainger/wwg/itemDetailsRender.shtml?ItemID=1611625135.

A drawback to such an approach can be that replacement of an entire gauge can be invasive. In the event the gauge is utilized in active process, the process may have to be shut down entirely as the gauge is replaced with a transmitting unit. Further, once a transmitting unit is installed, such a unit may have to be leak tested and also tested to ensure it is transmitting a correct signal. In addition, a conventional transmitting unit like that noted above can require wiring from the transmitter to a central location. This can require additional labor, and assumes suitable wiring paths are available at the site.

Another conventional approach can be found on the Internet at http://www.eissq.com/DialADC.html#Matlabcode. This approach includes capturing a digital image from a dial indicator with a webcam, and applying an algorithm to the data image. Drawbacks to such an approach can be that it is dependent upon optimal light conditions and can require considerable processing power to execute the algorithm.

BRIEF DESCRIPTION OF THE DRAWINGS

FIG. 16 is a flow diagram showing another method according to an embodiment.

FIG. 17A to 17C are diagrams showing a method of FIG. 16 for one type of gauge.

FIG. 18A to 18C are diagrams showing a method of FIG. 16 for another type of gauge.

FIG. 19 is a state diagram showing the operation of gauge reader according to another embodiment.

DETAILED DESCRIPTION

Various embodiments of the present invention will now be described in detail with reference to a number of drawings. The embodiments show a gauge reader, including a device, method and system that can be easily adapted to existing gauges without having to replace the gauge.

Figure 1:
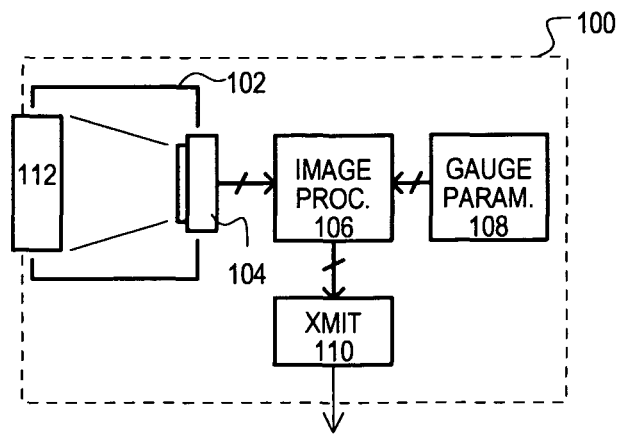
FIG. 1 is a block schematic diagram of a first embodiment of the invention.

A gauge reader according to a first embodiment is shown in block schematic diagram in FIG. 1, and designated by the general reference character 100. A gauge reader 100 can include a physical attachment structure 102, an image sensor 104, an image processing section 106, a gauge parameter store 108, and a transmitting section 110. A physical attachment structure 102 can enable an image sensor 104, and optionally the other components of the gauge reader, to be physically attached to a gauge 112. It is noted, and will be detailed in other embodiments below, that such physical attachment does not have to provide a direct image path from the gauge 112 to the image sensor 104. An image can be directed via an indirect path, such as by refraction or reflection. Preferably, a physical attachment structure 102 allows an image of the gauge to be reflected at an image sensor 104.

An image sensor 104 can receive an image of one or more gauges 112 and convert such an image into data values. Preferably, an image sensor 104 can convert an image into digital data. More preferably, an image sensor 104 can convert an image into an array of multi-bit pixel values. An image sensor 104 can take various forms, including but not limited to a charge coupled device (CCD) type sensor, or a complementary metal-oxide-semiconductor (CMOS) type sensor. Further, such a sensor may provide pixels values in monochrome format or a color format.

A gauge parameter store 108 can store parameter data corresponding to gauge(s) read by gauge reader 100. In particular, a gauge parameter store 108 can store data values that can enable an image processing section 106 to generate a final gauge reading value from received gauge image data. More detailed examples of such data and functions will be described below.

An image processing section 106 can receive image data from image sensor 106, and perform one or more predetermined image processing operations on such data. Preferably an image processor section 106 includes no more than one integrated circuit device. An image processing section 106 can analyze selected portions of the received image data, determine which data values represent significant gauge reading data, and convert such data into an intermediate gauge reading. Utilizing values within gauge parameter store 108 and the intermediate gauge reading, image processing section 106 can generate a final gauge reading value that is output to transmitting section 110.

A transmitting section 110 can transmit a final gauge reading value to a remote location, and thereby enable remote monitoring of the gauge values.

In this way, a gauge reader 100 can read a gauge image with an image sensor attached to the gauge, generate a gauge reading from such an image, and transmit the gauge reading to a remote location.

Figure 2:
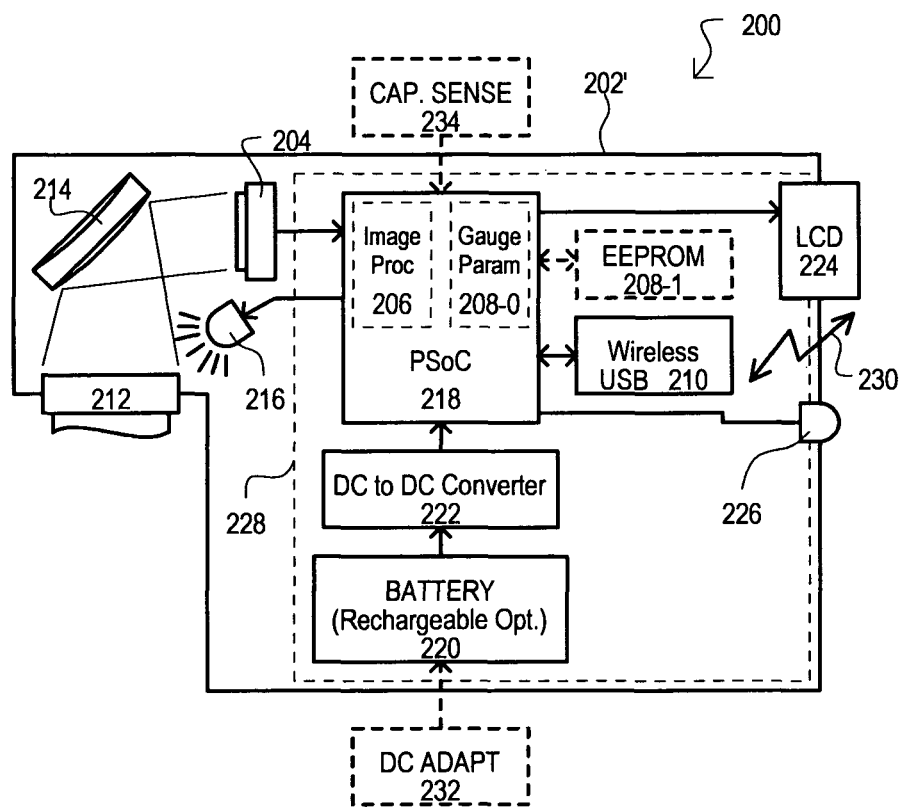
FIG. 2 is a block schematic diagram of a second embodiment of the invention.

Referring now to FIG. 2, a gauge reader according to a second embodiment is shown in a block schematic diagram and designated by the general reference character 200. A gauge reader 200 can include some of the same general sections as the embodiment of FIG. 1, accordingly, like sections are referred to by the same reference character but with the first digit being a "2" instead of a "1".

A gauge reader 200 can include a housing structure 202' that can include a physical attachment structure for attaching the gauge reader 200 to a gauge 212. That is, a gauge reader 200 can be a single unit that is physically attached to a gauge and that can transmit a gauge reading to a remote location. Such an arrangement is advantageously noninvasive, as no replacement process is needed for the existing gauge. A housing structure 202' can completely cover a gauge, isolating a gauge from external lighting conditions.

The particular arrangement of FIG. 2 also includes an image reflector 214 and an illumination source 216. An image reflector 214 can reflect an image of gauge 212 to image sensor 204. Such an arrangement can result in a compact physical structure to enable gauge reader 200 to be fit to a gauge in a non-intrusive manner that occupies a minimal amount of area. An illumination source 216 can illuminate a gauge 212 to enable an image of gauge 212 to be captured. In this way, the capture of an image is not dependent upon external lighting conditions. An illumination source 216 can be controlled by a control integrated circuit (IC) 218. In this way, an illumination source 216 can be selectively turned on when an image is required, and otherwise remain off. Preferably, an illumination source can be a light emitting diode (LED). However, an illuminating source need not be limited to the visible portion of the electromagnetic spectrum, and can include infrared or ultraviolet wavelengths depending upon the image sensor used, and application of the gauge that is read.

Referring still to FIG. 2, a gauge reader 200 can include a number of electronic components attached to an assembly structure 228. In particular, a control IC 218, a battery receiver 220, a DC to DC converter 222, and transmitting circuit 210 can be attached to assembly structure 228. In one particular arrangement, an assembly structure can be a circuit board. However, in alternate embodiments, an assembly structure can include additional or alternate structures, such as a multi-chip module as but one example.

Control IC 218 can include an image processing section 206 and an "on-board" storage circuit 208-0. Image processing section 206 can include a processor configured to execute a number of predetermined steps, including acquiring image data, processing selected portions of the image data to distinguish relevant data points from non-relevant data points, generating an intermediate gauge reading from the relevant data points, and then generating a gauge reading value from the intermediate gauge reading and gauge parameter data. An on-board storage circuit 208-0 can store instructions for executing the image processing and other operations. In addition, an on-board storage circuit 208-0 can store gauge parameter data, and thus form all or a portion of gauge parameter store. On-board storage circuit 208-0 preferably includes nonvolatile storage circuits, such as a programmable read-only-memory (PROM), electrical PROM (EPROM), electrically eraseable PROM (EEPROM, including "flash" EEPROM), magneto-resistive random-access memory (MRAM), ferroelectric RAM (FRAM), or phase change RAM. Such nonvolatile storage circuits can be used in combination with volatile storage circuits, such as dynamic RAM or static RAM. Preferably, a control IC 218 can be a PSoC™ Mixed-Signal Array manufactured by Cypress Semiconductor Corporation of San Jose, Calif., USA.

A control IC 218 can include additional functions. A control IC 218 can control the activation of all or any of the other circuits of the gauge reader 200. For example, circuits can be activated only when needed for a given function, and then returned to a deactivated state. A deactivated state can be a standby state or an off state, for example. Even more particularly, a control IC 218 can activate circuits periodically to generate and transmit a gauge reading, and then deactivate such circuits. In addition or alternatively, a control IC 218 can activate such circuits when requested by a user input, and then return such circuits to a deactivated state. Such an approach can advantageously conserve power consumption, which can be particularly beneficial in battery powered embodiments.

Still further, a control IC 218 can execute gauge reading evaluation operations in addition to generating a gauge value. For example, a control IC 218 can include an instructions executable by a processor that can determine if one or more gauge readings are out of a range, or a gauge reading exhibits some other predetermined behavior. In such case, a control IC 218 can send such "evaluation data" in place of, or in addition, to a generated gauge reading for transmission by transmitting circuit 210.

In the event additional memory is needed beyond that available by a control IC 218, a gauge reader 200 can further include one or more supplemental storage circuits 208-1 accessible by a control IC 218. Preferably, supplemental storage circuits 208-1 can be a single nonvolatile memory IC attached to assembly structure 228, even more preferably an EEPROM IC.

A transmitting section 210 can receive a gauge reading value from control IC 218 and output such a value on a communication path 230 to a location remote from the gauge 212 and attached gauge reader 200. In the particular example shown, transmitting section 210 can be a wireless universal serial bus (USB) IC that sends a wireless signal according to a conventional wireless USB protocol. Such an arrangement can eliminate the need to physically wire a monitoring/communication path between a gauge and a remote location at which a monitoring system resides. However, as shown below, other embodiments can provide an output suitable for transmission over a physical wiring.

Referring still to FIG. 2, a gauge reader 200 is preferably battery powered, and so can include battery receiver 220 and DC to DC converter 222. A battery receiver 220 can be a receptacle for containing a battery suitable for providing power to gauge reader 200. A DC to DC converter 222 can ensure an appropriate voltage level is provided to the various circuits of the gauge reader 200. In a preferred embodiment, a gauge reader 200 can be configured to receive rechargeable batteries, and can further include a DC adapter 232 for charging such rechargeable batteries. A DC adapter 232 can be one that is suitable for a local power source, which can be either an AC power source or DC power source depending upon conditions. Of course, a gauge reader can be powered directly via an AC or DC power source with DC adapter 232. In such arrangements, a battery receptacle may not be included.

While a gauge reader 200 can transmit a gauge reading value, it may also be desirable to provide additional indications on an external surface of a gauge reader 200 to allow local inspection of a gauge value. In the particular example of FIG. 2, gauge reader 200 can include a value display 224, and optionally, a status display 226. A value display 224 can display a gauge reading generated by gauge reader 200. Preferably, a value displayed can be the latest gauge reading generated by gauge reader 200. A value display 224 can preferably be an alphanumeric liquid crystal display (LCD), but may take alternate forms, such as an LED alphanumeric display, as but one example. A status display 226 can be provided to indicate a status of a gauge reader 200. Preferably, a status display 226 can indicate a low battery condition. However, either the value display 224 and/or status display 226 can indicate numerous other possible conditions, including but not limited to: normal operation of the gauge reader, abnormal operation of the gauge reader, gauge reading outside of limit(s), gauge reading within limit(s), gauge reader out of alignment with gauge, or maintenance/inspection due.

Optionally, a gauge reader 200 can include a user input 234. A user input 234 can be used to enter data values to the gauge reader 200. Such data values can be values stored within the gauge reader 200 or user inputs to start predetermined functions of the gauge. In the example of FIG. 2, a user input 234 can be capacitance sense input for a capacitance sensor type device, like a keyboard/touchpad, as but one example. Of course, a user input 234 could take various other forms, including electronic forms like a network interface (NIC), serial input or/output connection, including both wired and wireless forms thereof. A user input 234 can be fixed to a housing structure 202', or may be plugged into a gauge reader via a wiring.

It is noted that while the embodiment of FIG. 2 includes different ICs for both the control IC 218 and the transmitting circuit 210, such circuits could be integrated into one IC.

In this way, a gauge reader 200 can be a compact structure that can be attached to an existing gauge without the need for any wiring. This can provide for a very simple and quick conversion of gauges for use in automated systems.

The embodiment of FIG. 2 can provide for a very compact system due to the very limited number of components. However, it may be desirable to incorporate additional components for faster execution of certain tasks. One such arrangement is shown in FIG. 3.

Figure 3:
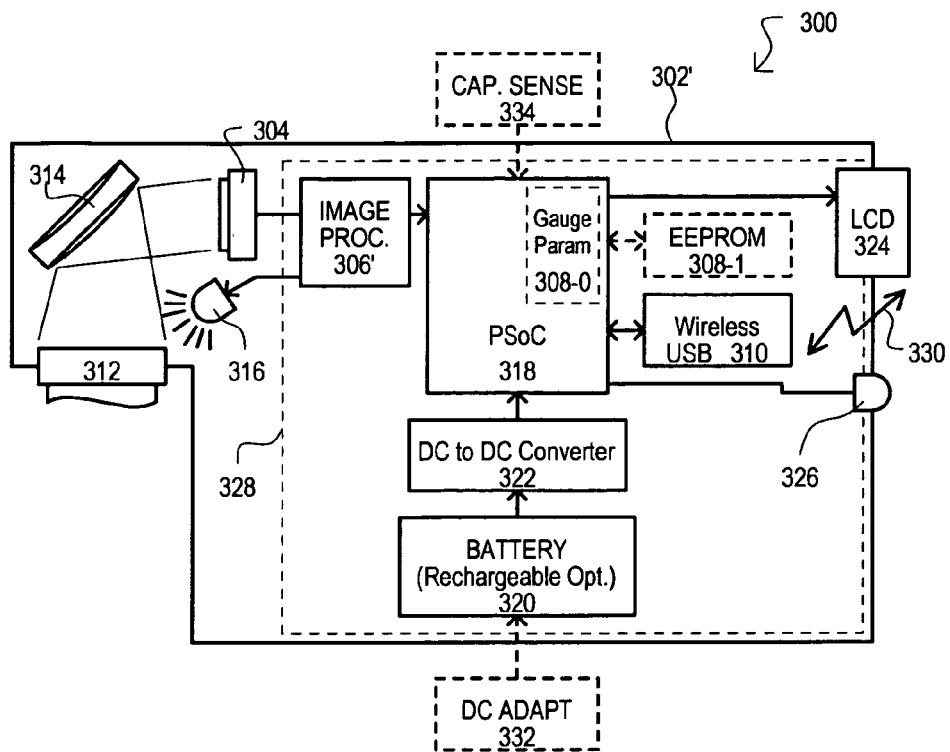
FIG. 3 is a block schematic diagram of a third embodiment of the invention.

Referring now to FIG. 3, a gauge reader according to a third embodiment is shown in a block schematic diagram and designated by the general reference character 300. A gauge reader 300 includes some of the same general sections as the embodiment of FIG. 2, accordingly, like sections are referred to by the same reference character but with the first digit being a "3" instead of a "2".

A gauge reader 300 can differ from that of FIG. 2 in that it can include a separate IC for executing the image processing function. In particular, gauge reader 300 can include image processing IC 306' for executing the image processing functions, thus such functions are not carried out by control IC 318. Even more particularly, an image processing IC 306' can analyze selected portions of the received image data, determine which data values represent significant gauge reading data, and convert such data into an intermediate reading value. A control IC 318 can include processing circuits 307 for generating a final gauge reading value based on the intermediate reading value and gauge parameter data. In a preferred embodiment, image processing IC 306' can be attached to assembly structure 328 along with the other circuit components. An image processing IC 306' can be a processor circuit with instructions for executing the image processing operation, an application specific integrated circuit (ASIC) designed to execute the image processing operation, or a programmable logic device (PLD) programmed to execute the desired image processing operations, to name but a few examples.

A control IC 318 can control the activation of image processing IC 306'. In particular, a control IC 318 can activate an image processing IC 306' to acquire an image, and then deactivate the device when the image data has been processed. Deactivation can include placing the device in a standby state, or turning the device off entirely.

In this way, a gauge reader 300 can be a compact and easily implemented device, but can also have very fast image processing capabilities.

Figure 4:
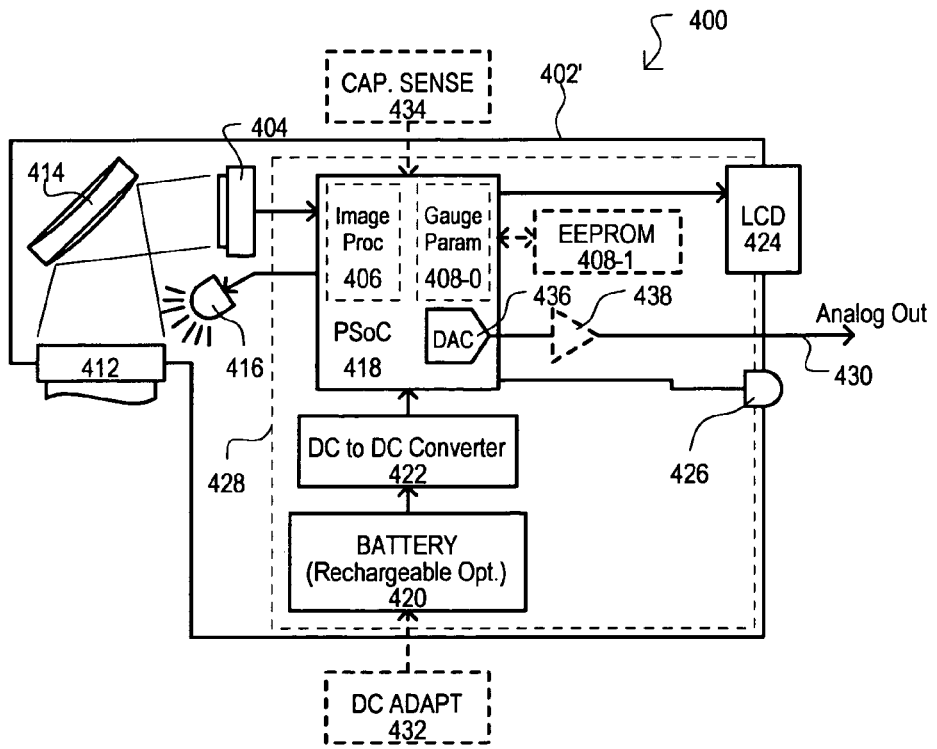
FIG. 4 is a block schematic diagram of a fourth embodiment of the invention.

Referring now to FIG. 4, a gauge reader according to a fourth embodiment is shown in a block schematic diagram and designated by the general reference character 400. A gauge reader 400 includes some of the same general sections as the embodiment of FIG. 2, accordingly, like sections are referred to by the same reference character but with the first digit being a "4" instead of a "2".

A gauge reader 400 can differ from that of FIG. 2 in that it can provide an analog output signal. More particularly, gauge reader 400 can include a digital-to-analog converter (DAC) 436 that can convert a digital gauge reading generated by image processing section 406 into an analog signal for output to a remote location. Preferably, DAC 436 can be formed from a portion of control IC 418. Optionally, a gauge reader 400 can include an amplifier circuit 438 for amplifying the analog output signal from control IC 418 into a transmitted signal. Such an analog output signal can be an industry standard signal suitable for use with control systems based on analog input signals.

In this way, a gauge reader 400 can be a compact and easily implemented device that is compatible with control systems designed for analog input signals.

Figure 5:
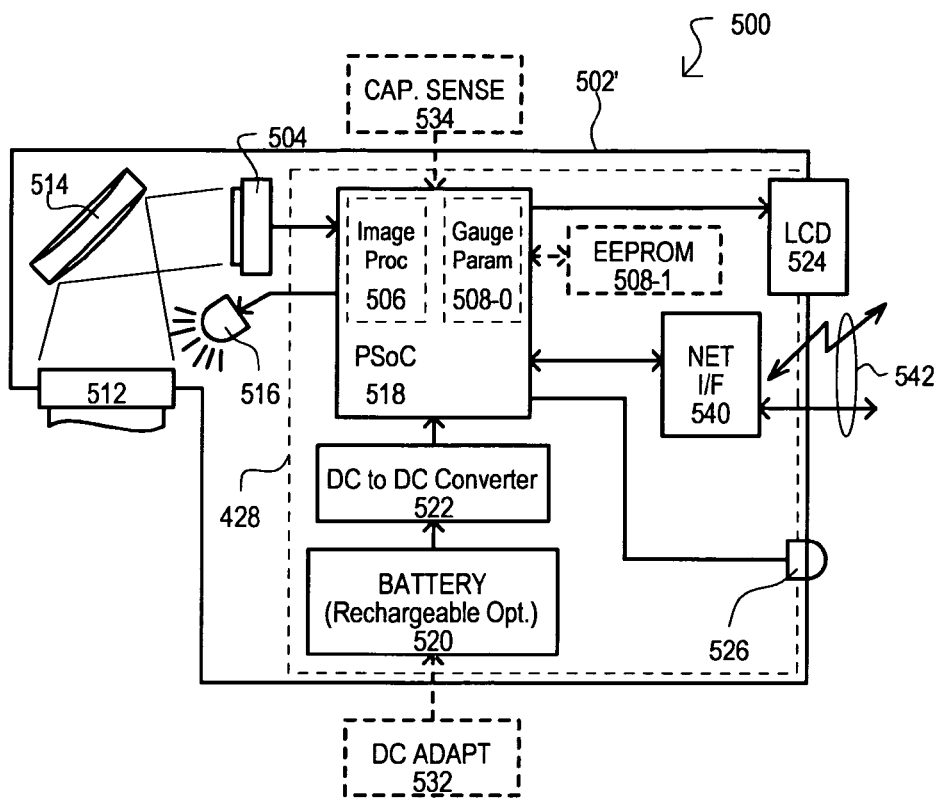
FIG. 5 is a block schematic diagram of a fifth embodiment of the invention.

Referring now to FIG. 5, a gauge reader according to a fifth embodiment is shown in a block schematic diagram and designated by the general reference character 500. A gauge reader 500 includes some of the same general sections as the embodiment of FIG. 2, accordingly, like sections are referred to by the same reference character but with the first digit being a "5" instead of a "2".

A gauge reader 500 can differ from that of FIG. 2 in that it can include a network interface 540. A network interface 540 can transmit and receive data in packet format over a network connection 542. A network connection 542 can be wired or wireless connection. A network connection can connect to a local area network (LAN), wide are network (WAN), or the Internet, for example.

In this way, a gauge reader 500 can be a compact and easily implemented device that is suitable for monitoring over a network.

Having described various embodiments and their associated circuits and interconnections, another embodiment will now be described that includes particular physical positions of components.

Figure 6A:
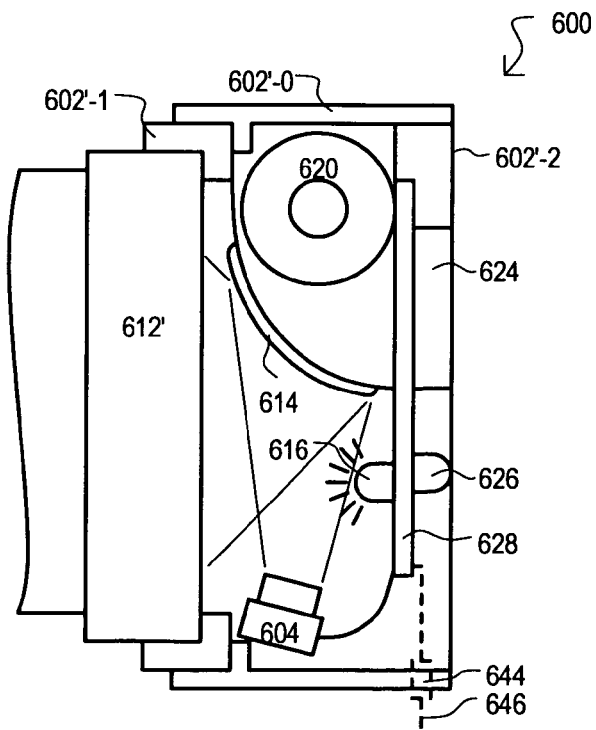
FIG. 6A is a cutaway view of a sixth embodiment of the invention.
Figure 6B:
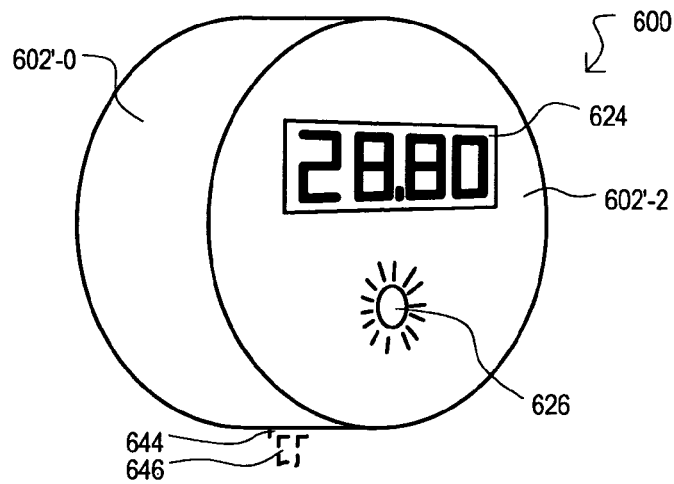
FIG. 6B is an external view of the sixth embodiment of the invention.

Referring now to FIGS. 6A and 6B, a gauge reader according to a sixth embodiment is shown in a cutaway view and external view, and designated by the general reference character 600. A gauge reader 600 can show one very particular physical implementation of the embodiments of FIGS. 1-5, accordingly, like sections are referred to by the same reference character but with the first digit being a "6" instead of a "1", "2", "3", "4" or "5".

Referring now to FIGS. 6A and 6B, a gauge reader 600 is shown in cutaway view to illustrate location of components. Gauge reader 600 is designed to accommodate a cylindrical gauge 612' having a circular face. A housing structure can include an annular shaped shell member 602'-0, an annular shaped gasket member 602'-1, and a face member 602'-2 that can be entirely, or partially transparent. A shell member 602'-0 can provide physical attachment points for various parts of the gauge reader. In the example shown, contained within shell member 602'-0 can be an image sensor 604, an image reflector 614, and an assembly structure 628. FIG. 6 also shows a battery receiver 620, illumination source 616, value display 624, and status display 626 connected to assembly structure 628. In alternate arrangements, such components could be connected to shell member and wired to an assembly structure. It is understood that an assembly structure can include the various circuit components electrically interconnected with one another. Preferably, a shell member 602'-0 prevents any light originating from outside of the gauge reader 600 from entering the interior of the shell member 602'-0.

A gasket member 602'-1 can allow a gauge to be securely attached to gauge reader 600 with a gauge face (i.e., portion of gauge to be read) positioned at a desired orientation with respect to shell member 602'-0. A gasket member 602'-1 can be rigid or flexible material. Preferably, a gasket member 602'-1 can prevent any light originating from outside of the gauge reader 600 from entering the interior of shell member 602'-0.

A face member 602'-2 can be transparent to allow value display 624 and status display 626 to be seen. Preferably, a face member 602'-2 prevents any light originating from outside of the gauge reader 600 from entering the interior of shell member 602-0. In alternate arrangements, value display 624 and/or status display 626 can extend outward from, or penetrate through face member 602'-2, in which case the face member 602'-2 can be entirely non-transparent.

In the event a gauge reader 600 provides an analog output signal for a physical wire, a gauge reader 600 can include a wire connector 644 for connection to a wire 646. Such a wire connector 644 can provide connection for single or multiple wire connections. For example, in the case of existing systems utilizing analog signals, such a connection may be one or two wires. However, for network type connections, such a connector 644 can accommodate standard network wiring including and beyond twisted pair wiring.

It is noted that while a gauge reader can attach to a gauge with a mechanical "snug" connection, this should not be construed as limiting to the invention. In alternate embodiments, stronger mechanical connections can be made, such as mechanical clasps, compression rings, bolts, or screws to name but a few examples. Further, a gasket member 602'-1 can be strongly attached to a gauge 612', while the remaining parts of the gauge reader 600 are removable from the gasket member 602'-1. For example, a gasket member 602'-1 can be attached to a gauge according to examples above, or more permanent methods such as adhesives (e.g., epoxy, specialized glue), or welds, while the remainder of the gauge reader 600 can be removable from the gasket member 602'-1. A gasket member 602'-1 can include threads, and the remainder of the gauge reader 600 may screw into the gasket member, the remainder of the gauge reader 600 may snap into gasket member 602-1, or the remainder of the gauge reader 600 may attach to gasket member 602-1 via bolts or screws, or the remainder of the gauge reader 600 may attach to gasket member 602-1 via magnets. Of course, these are but a few of the many possible examples.

While the above embodiments have demonstrated examples of particular gauge readers, alternate embodiments can include systems employing such gauge readers. A few examples of such systems will now be described.

Figure 7:
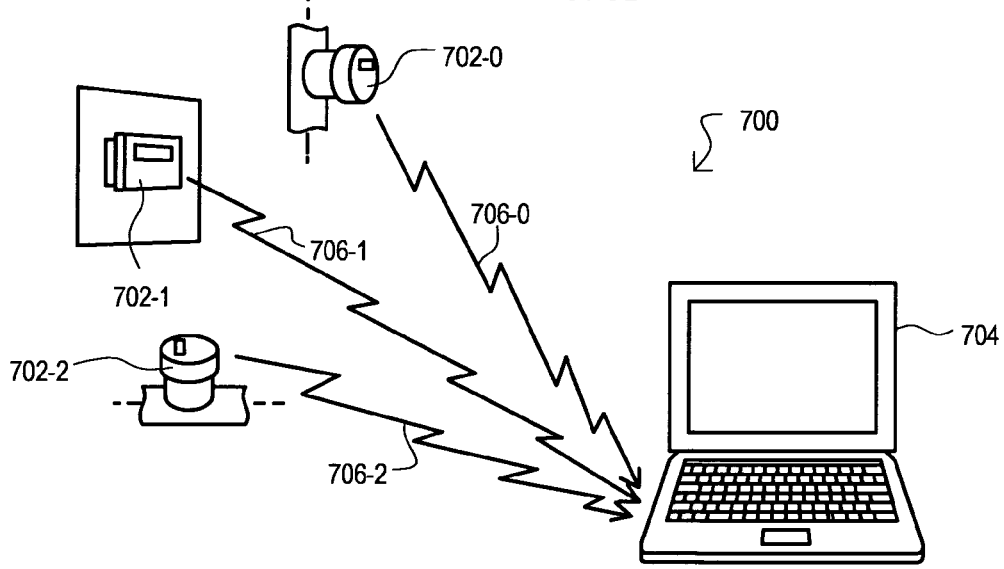
FIG. 7 is a diagram showing a seventh embodiment of the invention.

Referring now to FIG. 7, a system according to a seventh embodiment is shown in a block diagram and designated by the general reference character 700. A system 700 can include one or more gauge readers 702-0 to 702-2 and a monitoring device 704. In the example of FIG. 7, gauge readers (702-0 to 702-2) can each include image sensors physically attached to one or more gauges, and can include a wireless transmitter that transmits data to a monitoring device 704.

In the arrangement of FIG. 7, each gauge reader 702-0 to 702-2 can transmit data over a separate wireless channel 706-0 to 706-2, respectively. Such data can include gauge readings and/or evaluation data, as noted in the embodiments above. In one very particular example, data can be transmitted via wireless USB protocol.

A monitoring device 704 can include a wireless receiver 708 capable of receiving data via a wireless link. In the event a system 700 includes more than one gauge reader, a monitoring system 700 can include a wireless receiver 708 capable of distinguishing between the multiple channels. It is understood that a monitoring device 704 may be but one portion of a larger process control system. Further, in other embodiments, a system may include multiple monitoring devices that each monitor data for one, or a select group of gauge readers.

In this way a system can include one or more gauge readers that transmit gauge readings or other data to a monitoring device in a wireless fashion.

As noted above, some types of control systems system are configured to receive analog input values. Systems to accommodate such arrangements will now be described with reference to FIGS. 8, 9A and 9B.

Figure 8:
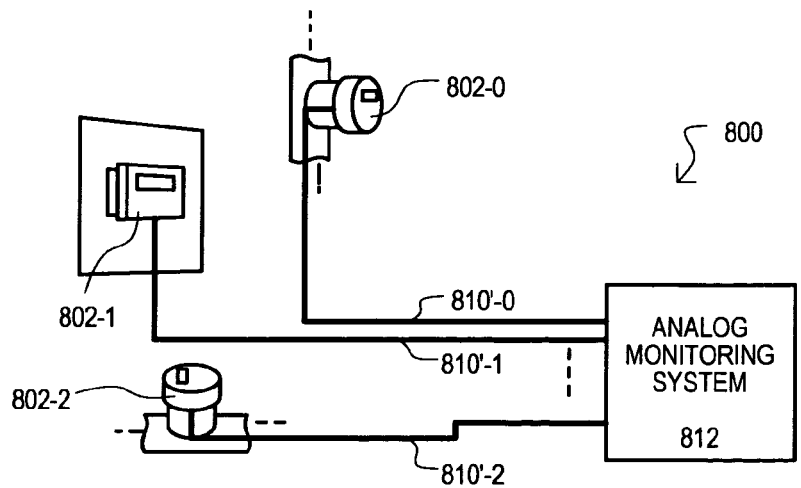
FIG. 8 is a diagram showing an eighth embodiment of the invention.

Referring now to FIG. 8, a system according to an eighth embodiment is shown in a block diagram and designated by the general reference character 800. A system 800 can include some of the same general sections as the embodiment of FIG. 7, accordingly, like sections are referred to by the same reference character but with the first digit being an "8" instead of a "7".

System 800 can differ from that of FIG. 7 in that each gauge reader 802-0 to 802-1 can include a wired transmitter circuit. Thus, data from the gauge readers 802-0 to 802-1 can be transmitted via wired channels 810'-0 to 810'-2, respectively. In addition, gauge readings can be received via analog inputs of an analog monitoring system 812.

Figure 9A:
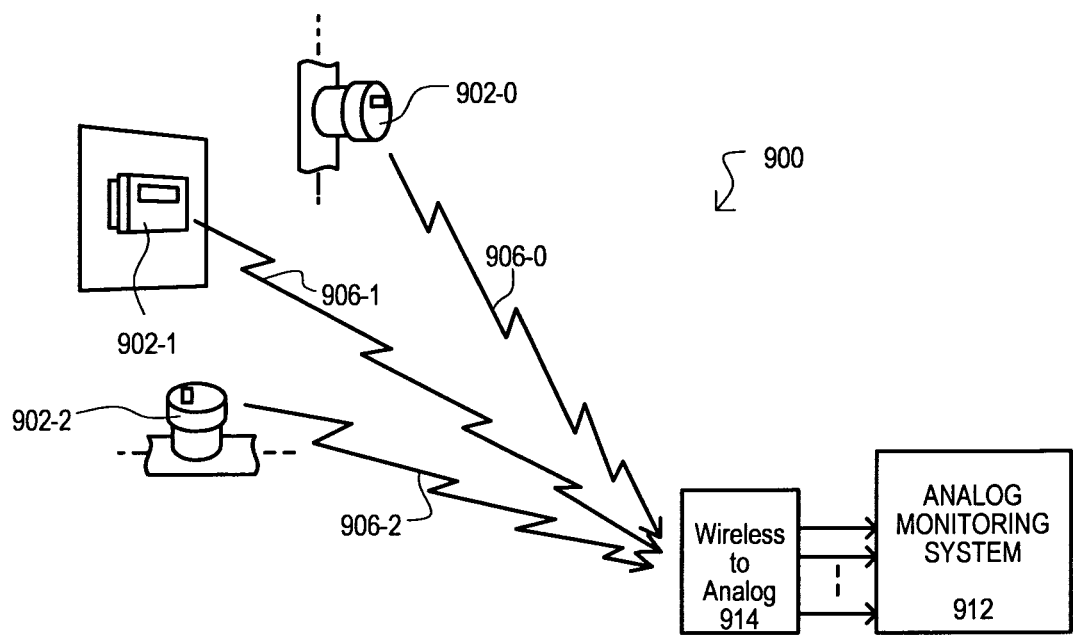
FIG. 9A is a diagram showing a ninth embodiment of the invention.

Referring now to FIG. 9A, a system according to a ninth embodiment is shown in a block diagram and designated by the general reference character 900. A system 900 can include some of the same general sections as the embodiment of FIG. 7, accordingly, like sections are referred to by the same reference character but with the first digit being an "9" instead of a "7".

A system 900 can differ from that of FIG. 7 in that it can include an analog monitoring system 912 as well as a wireless to analog converter 914. A wireless to analog converter 914 can convert data values received via wireless channels into analog signals suitable for analog monitoring system 912.

Figure 9B:
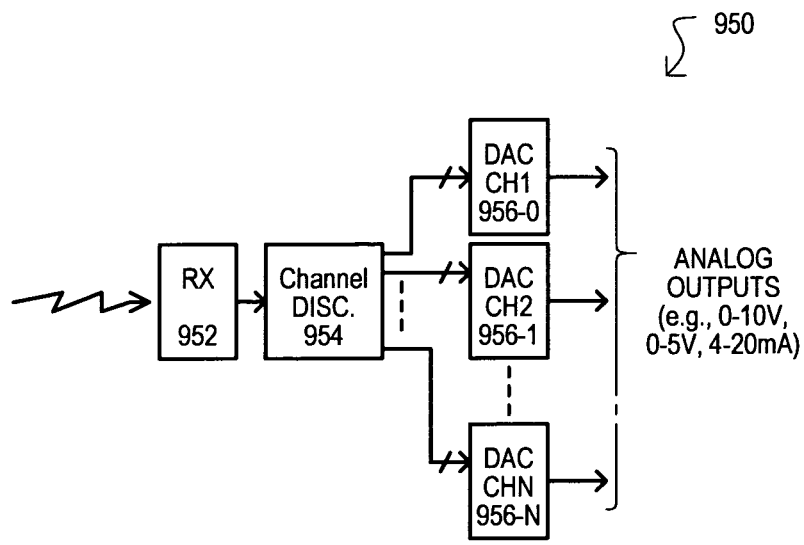
FIG. 9B shows one example of a wireless to analog converter that can be used in the embodiment of FIG. 9A.

Referring now to FIG. 9B one example of a wireless to analog converter is shown in a block schematic diagram and designated by the general reference character 950. A wireless to analog converter 950 can include a wireless receiver 952, a channel discriminator 954, and a number of DACs 956-0 to 956-N. A wireless receiver 952 can receive wireless data values and convert them to digital values. A channel discriminator 954 can output digital values corresponding to each received wireless channel to separate DAC (956-0 to 956-N). Each DAC (956-0 to 956-N) can generate an analog signal according to a received digital value.

In this way a system can include one or more gauge readers suitable for use in control systems based on analog signals.

Figure 10:
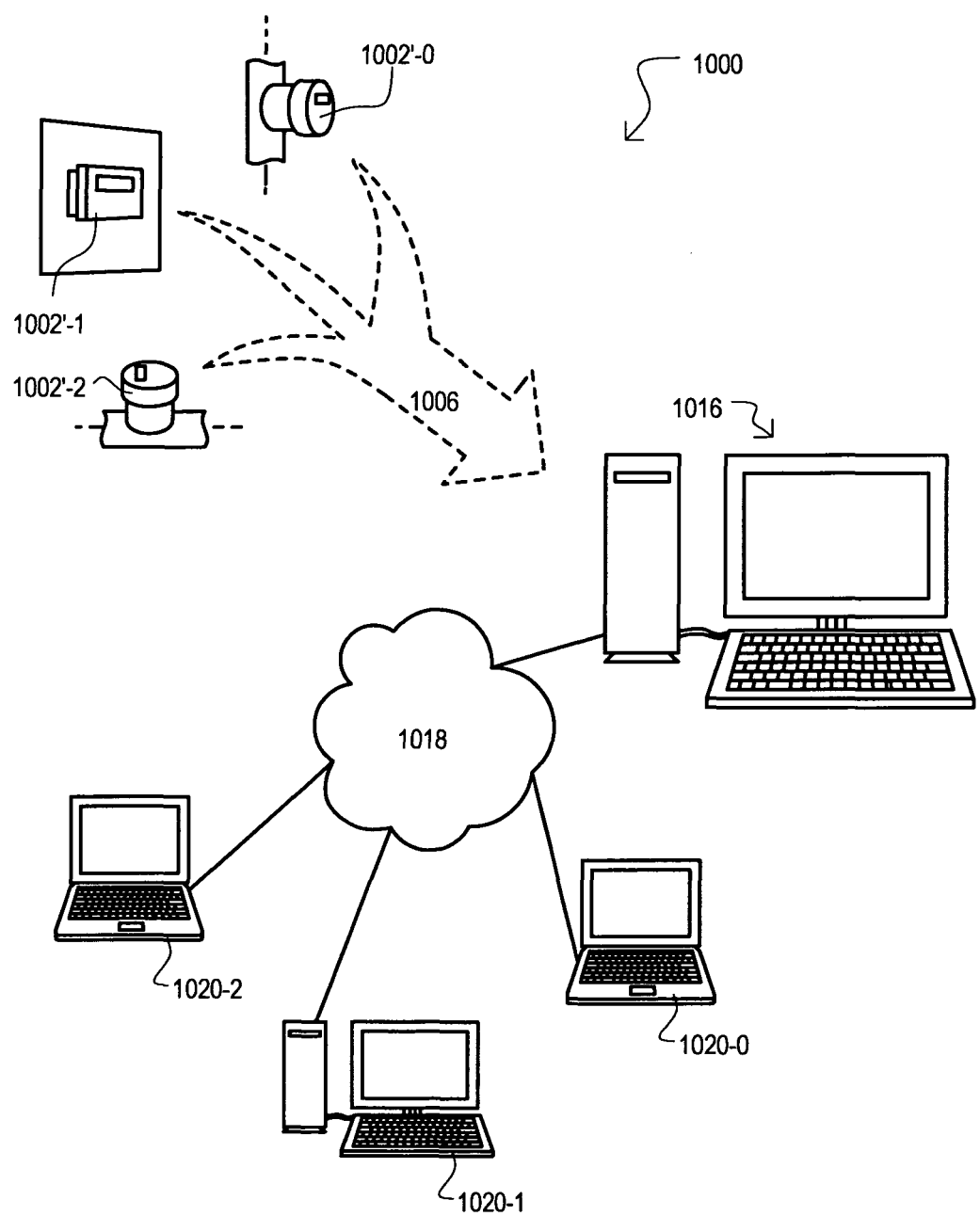
FIG. 10 is a diagram showing a tenth embodiment of the invention.

Referring now to FIG. 10, a system according to yet another embodiment is shown in a block diagram and designated by the general reference character 1000. A system 1000 can include some of the same general sections as the embodiment of FIG. 7, accordingly, like sections are referred to by the same reference character but with the first digits being "10" instead of a "7".

In the arrangement of FIG. 10, gauge readers 1002-0' to 1002-2' can transmit data over connections 1006 to a monitoring device 1016. Connections 1006 can be wireless connections, in which case gauge readers (1002-0' to 1002-2') can include wireless transmitters, or can be wireless connections, in which case gauge readers (1002-0' to 1002-2') can include wired transmitters, or some combination thereof.

A monitoring device 1016 can be network server that can receive and store data received from a gauge reader. Monitoring device 1016 can be connected to a network 1018, and thus enable access to such gauge reader data via one or more client devices (1020-0, 1020-1, 1020-2) via data packet communication protocols. A network 1018 can include a LAN, WAN or the Internet, as but a few examples.

In this way a system can include one or more gauge readers suitable for use in a networked system.

While the embodiments can include gauge readers and gauge reader systems, alternate embodiments can include methods for reading gauges. Examples of such methods will now be described.

Figure 11:
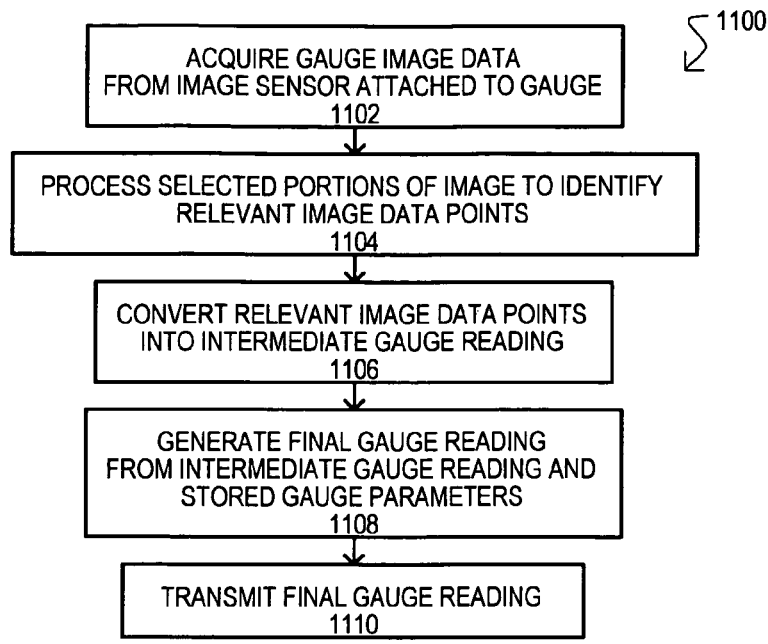
FIG. 11 is a flow diagram showing a method according to another embodiment.

A method according to one embodiment is shown in a flow diagram in FIG. 11 and designated by the general reference 1100. A method 1100 can include acquiring gauge image data from an image sensor attached to a gauge (step 1102). In one particular arrangement, such a step can include capturing an image of a gauge with a digital image sensor that provides a multi-bit value for each pixel of the image. Still further, such a step can include any of: illuminating a gauge prior to image capture, reflecting a gauge image to an image sensor, refracting a gauge image at an image sensor or focusing a gauge image at an image sensor, as but a few examples.

A method 1100 can also include processing selected portions of the acquired gauge image data to identify relevant image data points (step 1104). Such a step can include distinguishing pixels representing a measuring portion of the gauge image from other portions of the image. In particular, such a step can include scanning one or more selected patterns with respect to the image. This is in contrast to processing all portions of the image. A step 1104 can also include distinguishing pixel values from one another. As but a few examples, pixels can be distinguished by contrast (relative brightness or relative darkness), color, or grouping (same or similar contrast/color to adjacent pixels).

Relevant image data points can then be converted into an intermediate gauge reading (step 1106). A step 1106 can include generating a numerical value based on relevant image data points. Such a step can be strongly dependent upon the gauge configurations. As but a few of the many possible examples, such a numerical value can be any of: a slope of line, a position in the overall image, an area, a linear dimension (line length, arc size, circumference size, geometric shape perimeter), an angular measurement (degrees, radians), trigonometric function (sin, cos, etc.). Such values can also be a rate of change for any of the above such measurements, as determined by values generated for sequential images.

A method 1100 can further include generating a final gauge reading from the intermediate gauge reading and stored gauge parameters (step 1108). Such a step can include accessing stored gauge parameter and calculating the final gauge reading based on the accessed data and the intermediate gauge reading. In addition, or alternatively, such a step can include accessing gauge parameter data in a lookup table format using the intermediate gauge data as an input value.

A final gauge reading value can then be transmitted (step 1110). Such a step can include sending the gauge reading according the various techniques noted above, including a wireless signal or wired path, in digital form, or converted to analog form, as a discrete value, or embedded within a data packet, to name but a few.

In this way, a method can generate a gauge reading from an image sensor attached to the gauge, and transmit such a value.

Figure 12A:
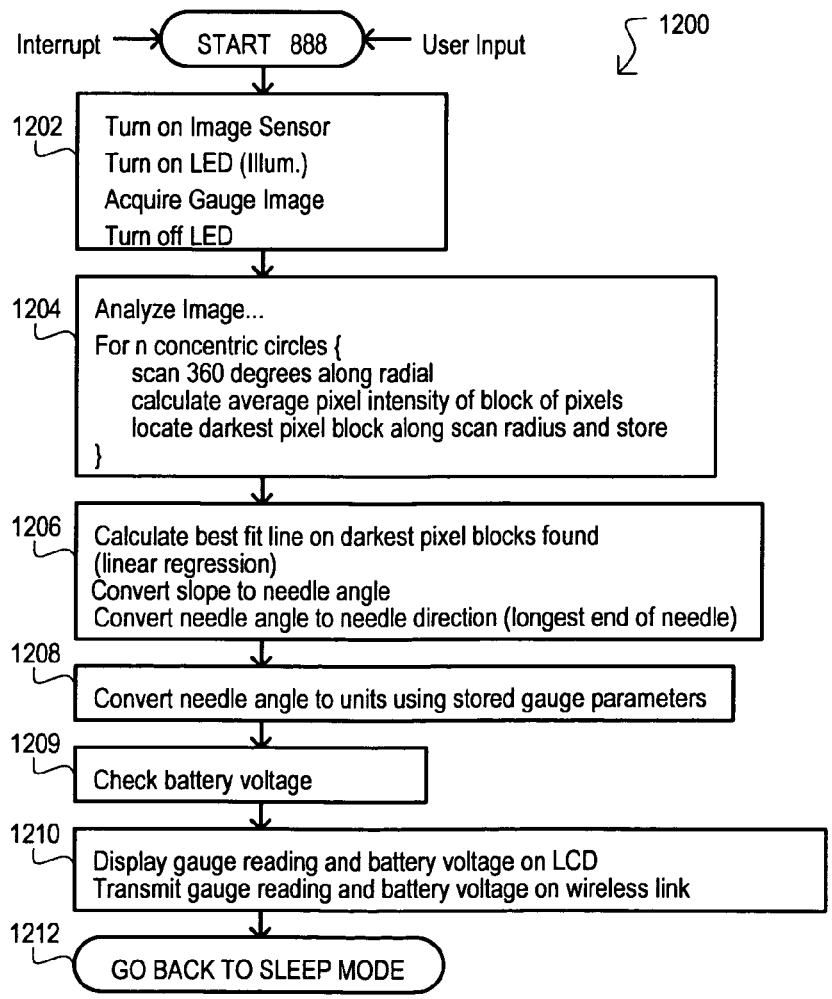
FIG. 12A is a flow diagram showing a method according to a further embodiment.

A more detailed method according to another embodiment will now be described with reference to FIGS. 12A to 12E. FIG. 12A is a flow diagram of the method, designated by the general reference character 1200. FIGS. 12B to 12E are diagrams illustrating various steps shown in FIG. 12A.

Referring now to FIG. 12A, a method 1200 can include particular implementations of the steps shown in FIG. 11, thus like steps are referred to by the same reference character but with the first digit being a "12" instead of an "11".

A method 1200 can include starting a gauge reading operation (step 1201). Such a step can include starting the process in response to an interrupt, such as that generated by a control circuit or receiving a user input either via a physical entry device attached to a gauge reader, or via a remote request.

In the example of FIG. 12A, a step 1202 can include the substeps of turning on an image sensor, turning on an illumination source for illuminating the gauge (in this case an LED), acquiring the gauge image, and then turning off the illumination source. Duration of an image acquisition time can be a gauge parameter value stored by a gauge reader.

Figure 12B:
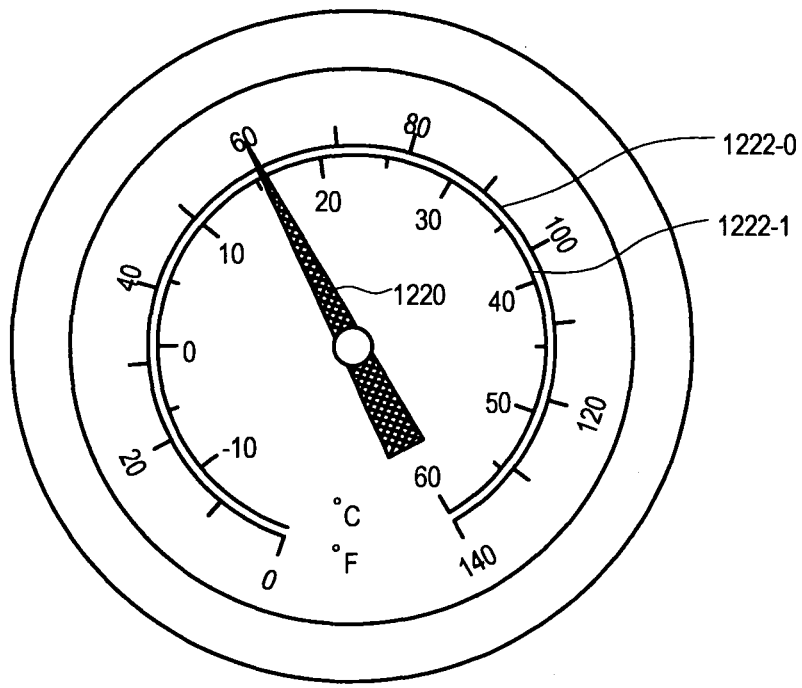
FIGS. 12B to 12E are diagrams showing one example of the method of FIG. 12A for one type of gauge.

A captured image for this very particular example is shown in FIG. 12B. FIG. 12B shows an image of a radial deflection gauge for measuring temperature. The image includes a needle 1220 indicating a measured temperature based on two different scales 1222-0 and 1222-1. Such an image can be in pixel form. Further, such an image may be considerably rougher due to pixelation depending upon the resolution of the image sensor used.

In the example of FIG. 12A, a step 1204 can include substeps particular for the gauge being measured. Thus, step 1204 includes scanning for "n" concentric circles. Coordinates for such a scan operation can be gauge parameter values stored by a gauge reader.

Figure 12C:
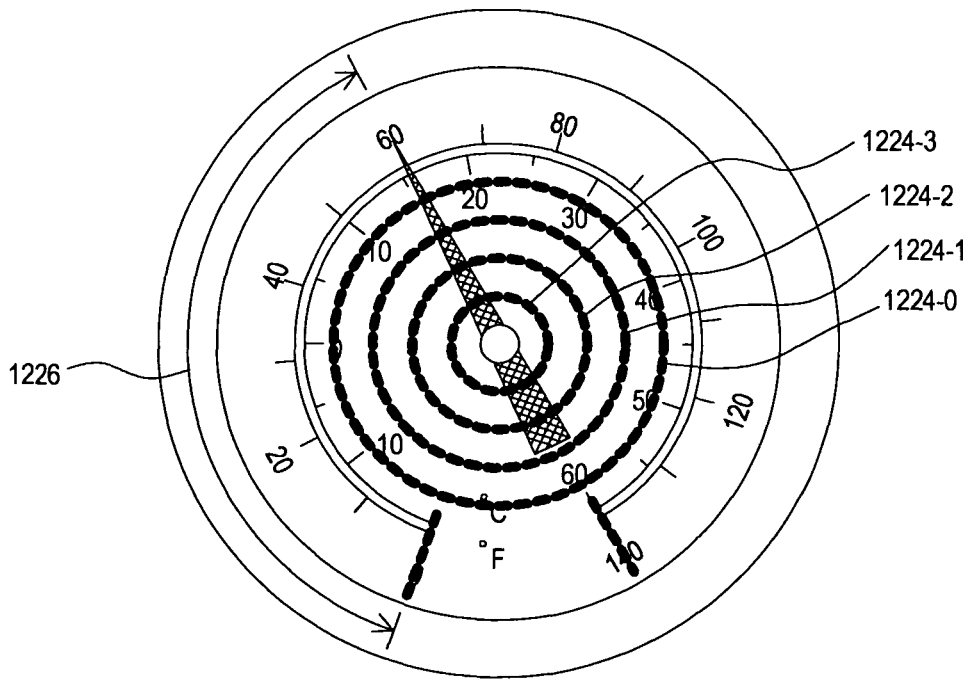

FIG. 12C shows one example of scanned concentric circles for the gauge of FIG. 12B. FIG. 12C shows the scan areas for four concentric circles 1224-0 to 1224-3. Of course, a greater or lesser number of circles could be scanned according to the accuracy and/or speed desired. However, the concentric circles represent a subset of the entire image and thus results in the processing fewer pixels than a conventional approach that processes all pixels of an image.

Referring back to FIG. 12A, for the example shown, a step 1204 can include, for each scanned concentric circle, examining pixel values for 360 degrees along the radial. For such pixels, an average pixel intensity for blocks of pixels can be calculated. In the particular example illustrated, a gauge needle is darker than a background, thus, the position of a darkest pixel along scanned radii can be stored. A relative intensity values/limits can be gauge parameter values stored by a gauge reader.

Figure 12D:
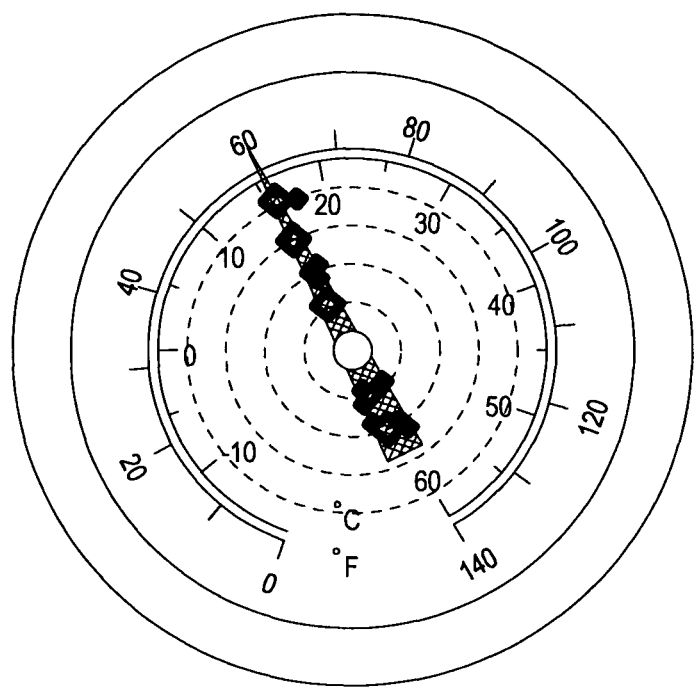

FIG. 12D shows one example showing the position of stored darkest pixels corresponding to the scanned circles of FIG. 12C.

Referring back to FIG. 12A, in the particular example illustrated, a step 1206 can include the substep of calculating a best fit line for the darkest pixel blocks found. Such a step can include a linear regression calculation, as but one example. A calculated slope can then be converted to a needle angle. Such a step can include conventional techniques, such as a trigonometric calculation (e.g., arctangent). In addition, because the needle of the illustrated example can deflect over more than a 180o, a needle direction can be determined (e.g., up or down). In the particular example shown, this can include measuring which of the line's ends is longer with respect to a needle pivot point.

Figure 12E:
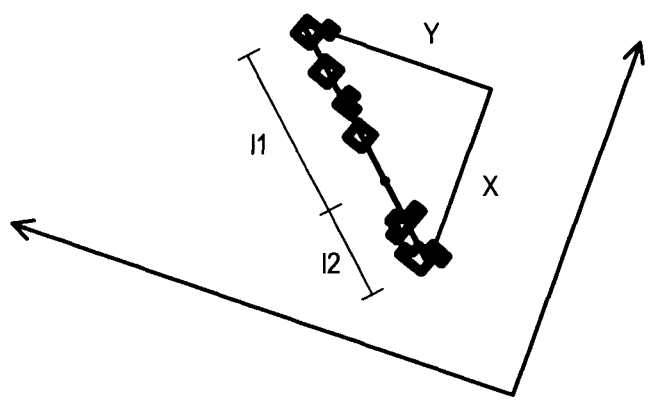

FIG. 12E shows one representation of the calculations described above for the pixel set shown in FIG. 12D. As shown, a slope can be calculated by horizontal (X) and vertical (Y) extensions of the line. A direction can be calculated by determining which length (l1 or l2) is longer.

Referring back once again to FIG. 12A, a step 1208 can include converting a needle angle into units using stored gauge parameters. Such a step can include dividing/multiplying the resulting value by a constant representing a conversion between degree and value (temperature) of deflection. Such conversion constant value can be gauge parameter values stored by a gauge reader.

Referring back to FIG. 12C, a measured angle is shown 1226.

Referring again to FIG. 12A, the particular method shown can include additional steps, including checking a battery voltage (step 1209). Such a step can include determining a battery voltage with an analog-to-digital conversion, and determining it if is below a predetermined limit.

A step 1210 can include displaying a gauge reading and a battery voltage on an LCD of the gauge reader. Further, such values can be transmitted over a wireless connection.

A method 1200 can return to a sleep mode (step 1212). A sleep mode can be a mode in which non-critical circuit components are turned off, or placed in a low power consumption state.

In this way, a method can generate a gauge reading for a radial gauge.

Of course, the embodiment of FIGS. 12A to 12E represents but one very particular type of gauge. The present invention should not be construed as being limited to any particular gauge configuration. To illustrate this, FIGS. 13A to 13D show the acquisition of a gauge reading from a multiple bar type gauge.

Figure 13A:
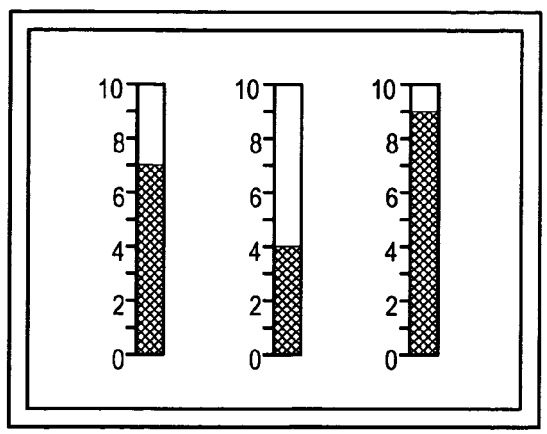
FIGS. 13A to 13D are diagrams showing one example of the method of FIG. 11 for another type of gauge.
Figure 13B:
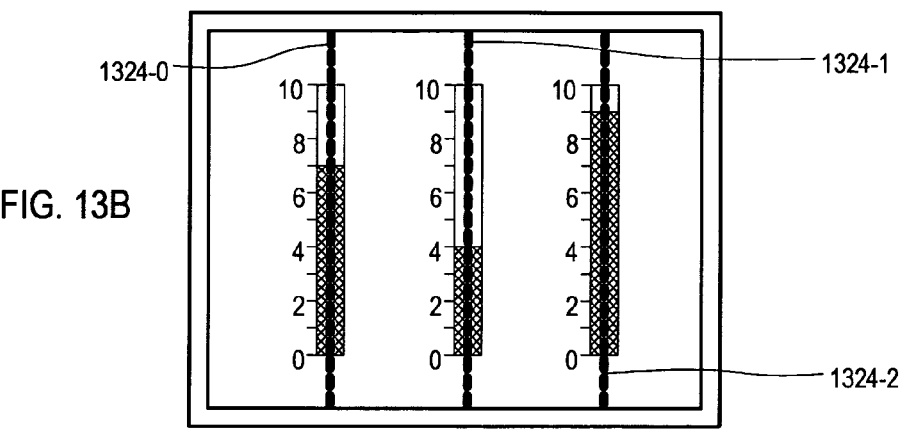
Figure 13C:
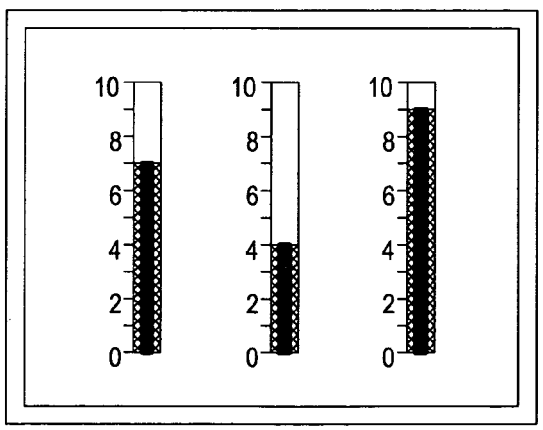
Figure 13D:
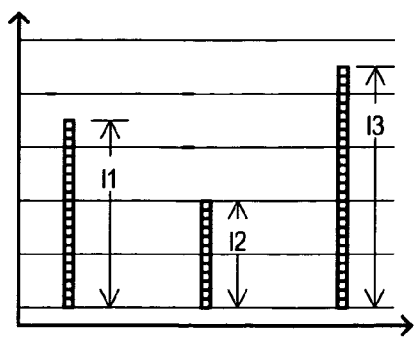

FIG. 13A shows an image of a gauge. FIG. 13B shows scanned areas for the gauge, which include three lines 1324-0 to 1324-2. FIG. 13C shows pixel data generated by taking highest contrast pixels. FIG. 13D shows how gauge reading values can be generated by a single measurement (length).

Such a measurement can be multiplied by a conversion values to generate final gauge values. Final gauge values can be transmitted along separate channels (wired or wireless), or multiplexed along the same channel. Such multiplexing can be time based, or include a gauge reader identifier to distinguish different gauge readers from one another.

In this way, a method can generate multiple gauge readings for the same gauge.

While gauge readers according to the various embodiments can transmit gauge readings for evaluation by a monitoring system, as note above, gauge reading evaluation can be performed by a gauge reader device itself. Examples of such an approach will now be described.

Figure 14:
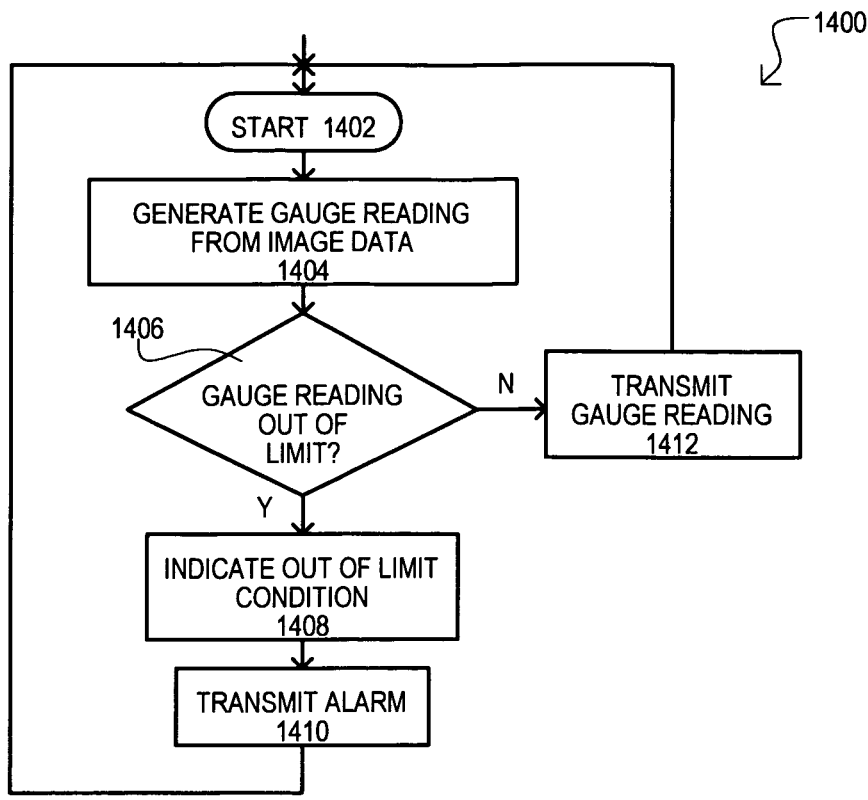
FIG. 14 is a flow diagram showing a method according to another embodiment.

Referring now to FIG. 14, a method according to another embodiment is shown in a block schematic diagram and designated by the general reference character 1400. A method 1400 can include starting a limit checking operation (step 1402). Such step can be in response to an automated interrupt signal or a user input, as but two examples. A method 1400 can then include generating a gauge reading from image data (step 1404). Such a step can include any of the gauge reading generation approaches noted above. As but particular examples, a step 1404 can include steps 1102 to 1108 of FIG. 11, or steps 1202 to 1208 of FIG. 12A.

A gauge reading can then be checked to determine if it is out of a predetermined limit (step 1406).

If a generated gauge reading is out of range (Y from block 1406), a gauge reader can indicate an out of limit condition (step 1408). Such an indication can be visual indication or an audio indication, as but two examples. A method 1400 can then transmit an alarm indication (step 1410). Such a transmission can be over a same channel as a gauge reading or over a different channel.

If a generated gauge reading is within a range (N from block 1406), a gauge reader can transmit the gauge reading according to any of the techniques noted above (step 1412).

Figure 15:
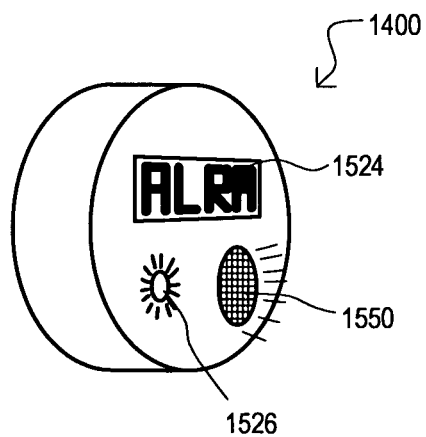
FIG. 15 is an external view of another embodiment of the invention.

FIG. 15 shows one example of a gauge reader 1500 showing various methods by which an out of limit condition can be indicated. A gauge reader 1500 can show a predetermined pattern on a value display 1524. Alternatively or in addition, a status display 1526 can emit a predetermined image (e.g., display on, display blinking, display particular color). Alternatively or in addition, a gauge reader 1500 can include a speaker 1550. Such a speaker 1550 can be driven to emit a particular sound. In one approach, a control circuit within gauge reader 1500 can drive an audio amplifier with a predetermined pattern. The audio amplifier can drive the speaker 1550 to generate the desired sound.

In these ways, a gauge reader can provide alarm indication when readings vary from predetermined conditions.

The various gauge readers shown above, can be designed to operate when placed with a particular orientation with respect to a measured gauge. However, for increased ease of use, a gauge reader can include a calibration function. Such function can enable a gauge reader to be fitted to a gauge with little adjustment and/or allow a gauge reader to readjust in the event the gauge reader is moved from an installed orientation with respect to the corresponding gauge. Particular examples of calibration approaches will now be described.

Referring now to FIG. 16, a calibration method according to an embodiment is shown in a flow diagram and designated by the general reference character 1600. A method can include reading a gauge to get an actual gauge reading (step 1602). Such a step can include visually inspecting a gauge to determine its actual gauge reading.

A gauge reader assembly can then be attached to the gauge (step 1604).

A calibration operation can then be started (step 1606). Such a step can be in response to a user input or when the gauge reader is first turned on, as but two examples.

A method 1600 can then generate an intermediate gauge reading from image data (step 1608). In particular arrangements, such step can include any of steps 1102 to 1106 of FIG. 11, or steps 1202 to 1206 of FIG. 12. A method 1600 can also include generating a final gauge reading from an intermediate gauge reading and stored gauge parameters (step 1610). In particular arrangements, such step can include step 1108 of FIG. 11 or step 1208 of FIG. 12.

A method 1600 can also include checking to see if a final gauge reading matches an actual gauge reading (step 1612). Such a step can include determining if the two gauge readings are within an acceptable range of one another. Optionally, such a step can further include determining how such readings vary from one another (too low or too high). If a suitable match exists (Y from block 1612), a calibration method can be complete. If a suitable match does not exist (N from block 1612), a calibration method can perform an adjustment to bring a final gauge reading closer to an actual gauge reading (step 1614). In the particular arrangement of FIG. 16, this step can include adjusting a gauge parameter or adjusting a gauge reading generation method. A method 1600 can then repeat a step 1610 with the adjusted gauge parameter(s) and/or the adjusted generation method.

In this way, a calibration method can adjust values utilized in how a gauge reading is generated until a gauge reading generated by a gauge reader essentially matches an actual gauge reading.

Referring now to FIGS. 17A to 17C, a first, very particular example of a calibration method for a gauge like that of FIG. 12B is shown in a series of diagrams. In FIGS. 17A to 17C, a gauge value can be generated according to the relationship:

Gauge_Reading=(angle+offset_calib)*$K$.

A value "Gauge_Reading" can be gauge reading generated by the method. A value "angle" can be a value generated from a fitted line slope (e.g., arctan of the slope). A value "offset_calib" can be a value that can be altered during a calibration step. A value "$K$" can be a conversion constant.

FIG. 17A shows an initial difference between a generated gauge reading 1702-0 (52° F.) and an actual gauge reading 1704 (60° F.). For example, a gauge reader can be rotated with respect to an ideal position. Because a generated reading is less than an actual reading, a value offset_calib can be increased by a predetermined amount. The gauge reading can then be recalculated.

FIG. 17B shows a subsequent difference between a generated gauge reading 1702-1 (56° F.) and an actual gauge reading 1704 (60° F.). Again, because a generated reading is less than an actual reading, a value offset_calib can be increased again, and the gauge reading recalculated.

FIG. 17C shows a subsequent generated gauge reading 1702-2 (60° F.) now matches an actual gauge reading 1704 (60°F.). As a result a calibration operation can be complete.

Referring now to FIGS. 18A to 18C, a second, very particular example of a calibration method for a gauge like that shown in FIG. 13A. In FIGS. 18A to 18C, a gauge value can be generated according to the relationship:

Gauge_Reading=length*$K$.

A value "Gauge_Reading" can be gauge reading generated by the method. A value "length" can be a value generated from a fitted line. A value "$K$" can be a conversion constant.

FIG. 18A shows an initial difference between a generated gauge reading 1802-0 (7) and an actual gauge reading 1804 (9). For example, a gauge reader can be further from a gauge than an ideal position, or optics can shrink a captured gauge image. Because a generated reading is less than an actual reading, a value $K$ can be decreased by a predetermined amount. The gauge reading can then be recalculated.

FIG. 18B shows a subsequent difference between a generated gauge reading 1802-1 (8) and an actual gauge reading 1804 (7). Again, because a generated reading is less than an actual reading, a value $K$ can be decreased again, and the gauge reading recalculated.

FIG. 18C shows a subsequent generated gauge reading 1802-2 (7F) now matches an actual gauge reading 1804 (7). As a result, a calibration operation can be complete.

It is noted that either calibration process can be a single step process that calibrates a gauge reader according to a difference in an actual reading and a generated reading. However, such an approach can require the actual gauge reading be entered into the gauge reader. This is in contrast to approaches shown generally by FIGS. 17A to 18C, which can provide an automatic calibration without the entry of the actual gauge reading into a gauge reader. That is, a user can press a button or sequence of buttons and a gauge reading will increase or decrease until it reaches the targeted actual value. Such an approach can be advantageously easy to execute.

In this way, gauge readers can be easily calibrated to match an actual gauge reading.

Having described various calibration methods, a particular method of operating a gauge reader to execute calibrate and other functions will now be described with reference to FIG. 19.

A state diagram representing an operation of a gauge reader according to one embodiment is shown in FIG. 19 and designated by the general reference character 1900. An operation can include waiting for an input (state 1902). In one particular example, this can include waiting for a user to generate a particular capacitance sense input value. One particular type of input (calibrate) can indicate a calibrate function, leading to the retrieval of parameter data (state 1904). Such a function can include retrieving parameter data from a parameter store. A gauge reader can then generate a gauge reading (state 1906). This can include generating a gauge reading according to any of the embodiments described above. An operation 1900 can then display a generated gauge value (state 1908). This can enable a user to observe the current gauge reading.

An operation 1900 can then return to wait for a change in input (state 1910). If an input indicates a current gauge reading is accepted (accept, gauge parameters can be stored (state 1912). Such gauge parameters can be used for future gauge reading operations. If a gauge reading is not accepted (continue) new parameters can be generated (state 1914), and an operation can return to state 1906. In one very particular example, a continue action can be to continue holding down a button while an accept action can be to cease holding down a button.

An operation 1900 can include other functions. In the example of FIG. 19, an action (send) from state 1902 can start a gauge reader send operation. Such a function can include states 1916 and 1918, which can be same as 1906 and 1908, respectively. Further, from state 1918, an operation can transmit a gauge reading (state 1920). Such a state can include any of the gauge reader data transmission methods described above.

Referring still to FIG. 19, an action (settings) can start a configuration or data setting function. Such a function can include an input state (1922). A particular action (start) can select a particular stored data value. Such a stored data value can include, as but a few examples, gauge parameter data, a time, a date, or output type (e.g., wired, wireless, voltage/amperage range). A selected data value can then be displayed (state 1924). The function can then proceed to another input state (1926). An action (data) can include a user entering a data value to overwrite an existing data value. Such a newly entered value can then be displayed (state 1928), and another input state 30) can be entered. If a newly entered value is accepted (accept) such a data value can be stored (state 1932). Input states 1922, 1926, and 1930 can also respond to actions (exit/timeout), by returning to previous input states.

Embodiments of the present invention are well suited to performing various other steps or variations of the steps recited herein, and in a sequence other than that depicted and/or described herein.

For purposes of clarity, many of the details of the various embodiments and the methods of designing and manufacturing the same that are widely known and are not relevant to the present invention have been omitted from the following description.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It is also understood that the embodiments of the invention may be practiced in the absence of an element and/or step not specifically disclosed. That is, an inventive feature of the invention can be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A gauge reading system, comprising:
a parameter store that stores parameter data in digital form for at least one gauge;
an image processing circuit coupled to receive image data from an image sensor physically attached to at least one gauge, wherein the image data comprises a plurality of pixels along at least one path intersecting a needle of the at least one gauge, and wherein the image processing circuit is configured to analyze the image data to generate image data points corresponding to a gauge image by determining an average intensity for the plurality of pixels and identifying pixels within an intensity limit from the average intensity, and wherein the image processing circuit is further configured to generate a gauge reading based on the identified pixels within the intensity limit from the average intensity and the parameter data;
a transmitting circuit configured to transmit the gauge reading to a location remote from the gauge; and
control circuit configured to activate the image processing circuit and to couple the gauge reading to the transmitting circuit.

2. The gauge reading system of claim 1, wherein:
the control circuit and the image data analyzer circuit are formed in a single integrated circuit substrate.

3. The gauge reading system of claim 1, further including:
an image sensor that generates the image data.

4. The gauge reading system of claim 3, further including:
an illumination source coupled to control circuit for illuminating a gauge during image sensing operation by the image sensor.

5. The gauge reading system of claim 4, wherein:
the illuminating source comprises a light emitting diode.

6. The gauge reading system of claim 3, further including:
the parameter store, image processing circuit, a transmitting circuit, and control circuit are interconnected to one another on a same integrated circuit (IC) assembly; and
an enclosure containing the IC assembly and including a gauge interface for physically fixing the enclosure to a gauge.

7. The gauge reading system of claim 6, wherein:
the enclosure further includes a battery receptor coupled to the IC assembly for receiving at least one battery and providing power to the IC assembly.

8. The gauge reading system of claim 7, further including:
a DC adapter coupled to the battery receptor for converting an external power source into a predetermined DC input voltage.

9. The gauge reading system of claim 6, further including:
a display formed on an outside surface of the enclosure for displaying at least the gauge reading.

10. The gauge reading system of claim 3, further including:
at least one image reflector for reflecting a gauge image to the image sensor.

11. The gauge reading system of claim 1, further including:
a mixed-signal array integrated circuit that contains digital circuit blocks including a processor and corresponding random access memory, and analog circuit blocks, and includes at least the control circuit.

12. The gauge reading system of claim 11, wherein:
the mixed-signal array integrated circuit includes a capacitance sense input for detecting capacitance changes at a plurality of capacitance sensors.

13. The gauge reading system of claim 1, further including:
at least one digital-to-analog converter (DAC) that converts the gauge reading from a digital value to an analog value.

14. The gauge reading system of claim 13, wherein:
a mixed-signal array integrated circuit that contains digital circuit blocks including a processor and corresponding random access memory and analog circuit blocks, including the at least one ADC.

15. The gauge reading system of claim 1, wherein:
the image correlation selection further activates a limit indication when the gauge reading is outside of a predetermined limit.

16. The gauge reading system of claim 15, wherein:
the parameter store, image processing circuit, a transmitting circuit, and control circuit are interconnected to one another on a same integrated circuit (IC) assembly; and
an enclosure containing the IC assembly and including a gauge interface for physically fixing the enclosure to a gauge, and an alarm indicator activated when the limit indication is activated.

17. The gauge reading system of claim 16, wherein:
the alarm indication is selected from the group consisting of a predetermined light emitting diode pattern, predetermined liquid crystal display patterned, and a predetermined audio output.

18. The gauge reading system of claim 16, wherein:
the parameter store includes at least one location for storing a calibration value variable; and
the image processing circuit generates gauge reading from the image data points and the at least one calibration value variable.

19. A method of reading a gauge, comprising:
a. acquiring image data of a gauge from an image sensor physically attached to the gauge;
b. processing the image data in a gauge reading system to distinguish gauge measurement points from non-measurement points, wherein distinguishing the gauge measurement points from non-measurement points comprises:
scanning a predetermined pattern of pixels along at least one path intersecting a needle of the gauge, and
determining an average pixel intensity for the pattern of pixels;
c. determining a gauge reading from the gauge measurement points based on pixels of the image data within an intensity limit from the average pixel intensity and at least stored gauge parameter data;
d. sending the gauge reading to a location remote from the gauge.

20. The method of claim 19, further including:
prior to a. to d.,
acquiring image data of the gauge with the image sensor physically attached to the gauge; and
reading image data of the gauge from the image sensor.

21. The method of claim 20, wherein:
prior to acquiring image data, turning on the image sensor; and
after reading image data, turning off the image sensor.

22. The method of claim 20, wherein:
prior to acquiring image data, turning on an illumination source to illuminate the gauge; and
after acquiring image data, turning off the illumination source.

23. The method of claim 19, wherein:
b. includes determining measurement points from non measurement points in the pattern of pixels, wherein the pattern of pixels represents less than all of the image data;
c. includes converting the measurement points to a predetermined format data, and
generating the gauge reading with at least the predetermined format data.

24. The method of claim 23, wherein:
the image data comprises a plurality of pixels; and
determining measurement points from non-measurement points includes determining a position of a highest contrast pixel of the pattern of pixels.

25. The method of claim 23, wherein:
the gauge is radial gauge; and
the pattern of pixels includes pixel locations corresponding to a plurality of concentric circles within an image of the gauge.

26. The method of claim 23, wherein:
the gauge is linear gauge; and
the pattern of pixels includes pixel locations corresponding to at least one line within the image of the gauge.

27. The method of claim 19, further including:
checking a battery status of a battery within an assembly attached to the gauge; and
activating an indication if the battery status is outside of a predetermined limit.

28. The method of claim 27, wherein:
activating an indication includes a step selected from the group of:
activating a visual indicator assembly,
activating an audio indicator on the assembly, and
sending an alarm indication to a location remote from the gauge.

29. The method of claim 19, further including:
sending the gauge reading to a location remote from the gauge.

30. The method of claim 29, wherein:
sending the gauge reading includes at step selected from the group of:
transmitting the gauge reading wirelessly,
sending a digital electrical signal via at least one wire, and
sending an analog electrical signal via at least one wire.

31. The gauge reading system of claim 15, further including:
displaying the gauge reading on an assembly connected to the gauge.

32. The method of claim 19, further including:
calibration, wherein the calibration comprises:
  i. acquiring image data of the gauge with the image sensor physically attached to the gauge.
  ii. processing the image data to distinguish gauge measurement points from non-measurement points;
  iii. determining a gauge reading from the gauge measurement points, the stored gauge parameter data, and calibration parameter data;
  iv. if the gauge reading determined in step iii does not correspond to an actual gauge reading, changing the calibration parameter data; and
  v. repeating steps i to iv until gauge reading determined in step iii corresponds to an actual gauge reading.

33. A gauge reading system, comprising:
at least one gauge reader, comprising
an image sensor for generating digital image data,
an attachment for affixing the gauge reader to a gauge and directing an image of the gauge image to the image sensor,
an image processor for generating a gauge reading from the image data, wherein the image processor is configured to determine an average intensity for a plurality of pixels in the digital image data situated along at least one path intersecting a needle of the gauge, identify pixels of the plurality of pixels having and intensity within an intensity limit from the average intensity, and generate a gauge reading based on the pixels of the image having a predetermined deviation from the average intensity, and
an output circuit that outputs the gauge reading to a location remote from the gauge.

34. The gauge reading system of claim 33, wherein:
the output circuit comprises a wireless transmitter that transmits gauge reading via a wireless connection.

35. The gauge reading system of claim 34, further including:
a computer based monitoring system comprising,
a monitoring central processing unit,
a monitoring memory for storing monitoring computer program, and
a wireless receiver for receiving the gauge reading via the wireless connection.

36. The gauge reading system of claim 33, wherein:
the output circuit comprises a network interface.

37. The gauge reading system of claim 34, further including:
a monitoring system that includes at least one analog control signal input;
a wireless receiver for receiving the gauge reading via the wireless connection; and
at least one digital-to-analog converter coupled to the analog control signal input that converts the gauge reading received by the wireless receiver from a digital value to an analog signal.

38. The gauge reading system of claim 23, wherein:
the output circuit includes
at least one digital-to-analog converter input that converts the gauge reading received from a digital value into an analog signal.

39. The gauge reading system of claim 33, wherein:
the gauge reader further includes an illumination source that illuminates an attached gauge.

40. The gauge reading system of claim 33, wherein:
the gauge reader further includes a reflector for reflecting an image of an attached gauge to the image sensor.

41. The gauge reading system of claim 1, wherein:
the transmitting circuit transmits the gauge reading via a wireless signal.

* * * * *